March 4, 1952  E. K. METTLER ET AL  2,588,269
CALCULATING INSTRUMENT WITH OPTICAL
PROJECTION SYSTEM FOR MAGNIFICATION Filed April 5, 1951  3 Sheets-Sheet 3

Inventors:
Erhard Karl Mettler and
Johann Meier,
By: Pierce, Scheffler & Parker,
Attorneys.

UNITED STATES PATENT OFFICE 2,588,269

CALCULATING INSTRUMENT WITH OPTICAL PROJECTION SYSTEM FOR MAGNIFICATION

Erhard Karl Mettler, Zollikon, Zurich, and Johann Meier, Kusnacht, Zurich, Switzerland Application April 5, 1951, Serial No. 219,364
In Switzerland July 19, 1950

8 Claims. (Cl. 235—84)

This invention relates to a calculating instrument having a plurality of rotatable scale carriers and having lined scales according to the principle of the slide rule.

Objects of the invention are to provide a calculating instrument of the type stated in which the casing of the instrument encloses rotatable scale carriers which each have one or more fine scales, and an illuminating device and an enlarging optical system by means of which a small section of the fine scales is depicted in enlarged scale on a projection screen provided on the casing, each of said carriers having fine scales being mechanically coupled by means of a toothed gearing with a further rotatable scale carrier on which are located mutually corresponding coarse scales which over a large section of their length are made directly visible, all the fine scale carriers being each disposed co-axially and all the coarse scale carriers being each disposed co-axially. Objects are to provide in a calculating instrument of the type indicated, fine scale carriers fitted in the lower part of the casing, their axis of rotation standing perpendicular to the base plane of the instrument, the axis of rotation of the coarse scale carriers running parallel to the base plane of the instrument, a window being provided in the top part of the front wall of the casing for reading the sections of the fine scales depicted magnified on the projection screen, and a further window being situated below the first mentioned window through which further window the sections visible at any time of the corresponding coarse scales can be read. Objects are to provide, in a calculating instrument of the type stated, a casing enclosing rotatable scale carriers which each have one or more fine scales, an illuminating device and a magnifying optical system by means of which a small section of said fine scales is depicted in enlarged scale on a projection screen provided in said casing, each of the fine scale carriers being mechanically coupled with a further rotatable scale carrier on which are located mutually corresponding coarse scales which over a large section of their length are made directly visible, and an adjusting device operable from outside the casing of the instrument, by means of which each of the pairs consisting of a fine scale carrier and the corresponding coarse scale carried mechanically coupled with it can be rotated individually or simultaneously with each other at will. Yet another object of the invention is a calculating instrument of the type stated, wherein the fine scale sections of each fine scale carrier depicted on the projection screen in enlarged scale and the directly readable coarse scale sections of the associated coarse scale carrier appear by means of colour filters in the same colouring, the scales of each pairing of fine scale and coarse scale carriers having their own colour, and the various visible scale sections being indicated with the mathematical functions represented by them.

These and other objects and the advantages of the invention will be apparent from the following specification when taken with the accompanying drawing in which.

Figure 1:
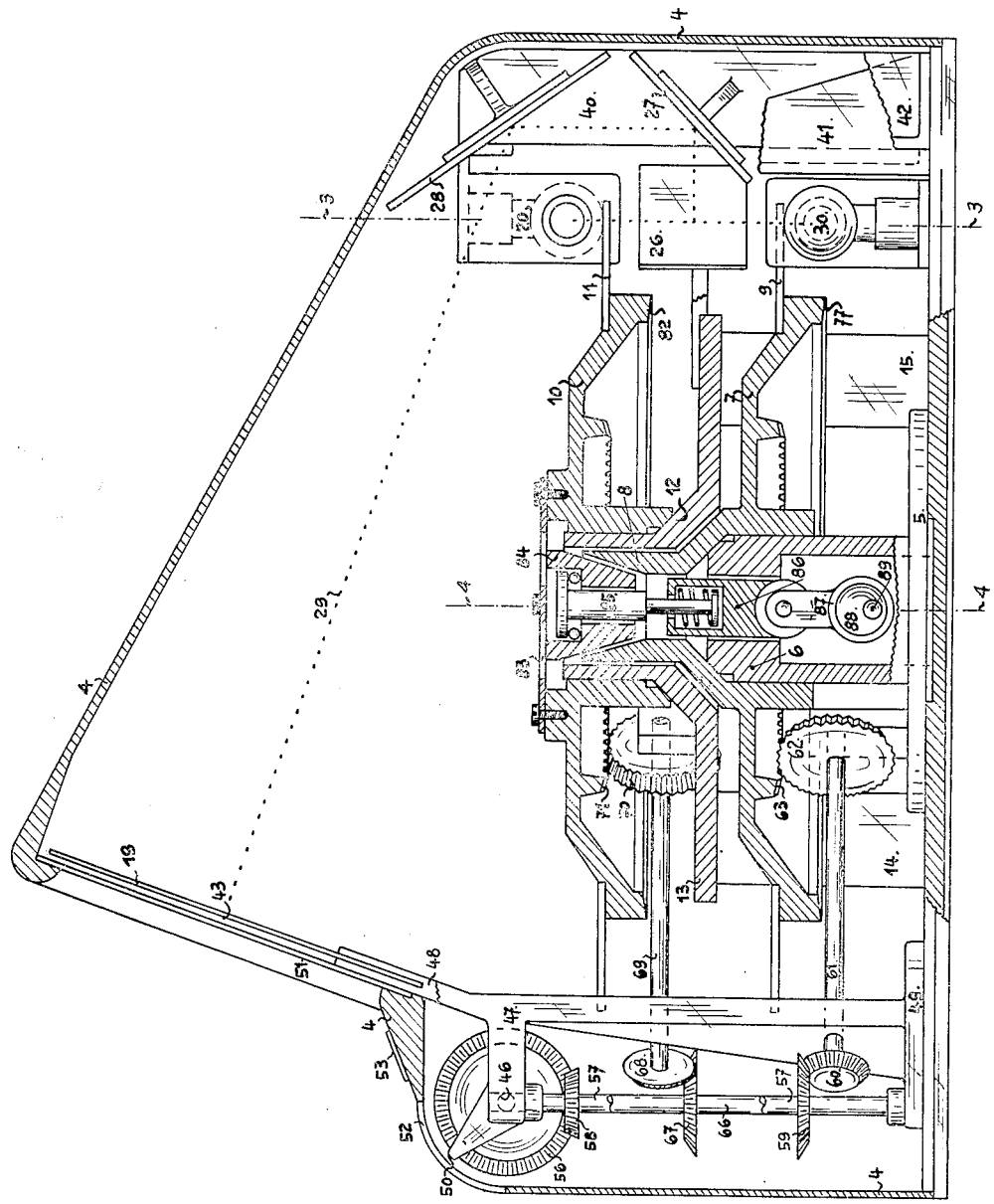
Fig. 1 is a longitudinal section of the calculating instrument embodying the invention.

In the drawing, the reference numerals 3 identify the base of the instrument on which the casing 4 is supported in removable manner. The flange 5 of a partially cylindrical and partially conical sliding bearing 6 is screwed on to the middle portion of the base 3. On this bearing 6 a scale carrier 7 is rotatably mounted. The scale carrier 7 possesses a tubular and conical taper 8 which extends upwards in an axial direction, and at the outer rim of said scale carrier 7 a transparent annular glass disc 9 is cemented on. A further rotatable scale carrier 10 with an annular glass disc 11 is seated on a cylindrical conical sliding bearing 12, the plate-shaped foot part 13 of which is screwed on to the columns 14, 15, 16, 17 as is clearly shown in Fig. 2.

The columns 14 to 17 are preferably cast integral with the base plate 3. Further, the sliding bearings 6 and 12 are so secured on the base 3 that the wheel-shaped scale carriers 7 and 10 are exactly co-axial, being spaced from one another in the axial direction. On each of the plane disc surfaces of the transparent glass rings 9 and 11, fine scales extending concentrically to each other are fitted with such fine graduation and lettering that they cannot be read directly with the naked eye. These lined scales which are located at a small radial spacing from each other, lie on the rings 9 and 11 roughly at the place of the circular line 18 indicated in Fig. 2. By means of an illuminating device and an enlarging optical system at any time a small section of these fine scales are projected with large magnification on to a projection screen 19, which is preferably a semi-transparent opaque disc. The illuminatconsist of two equal parts, each of which is associated with one of the two fine scale carriers 7 and 10. For the enlarged reproduction of the fine scale sections located on the upper scale carrier 10, a ray of light proceeding from a lamp 20 first passes through a lens system 21, 22 (Fig. 3) and is directed by means of a mirror 23 on to the glass disc 11. The light rays proceeding from the illuminated fine scale sections pass through the projection lens 24 and are thrown to the left by a prism 25 (Fig. 3) on to a mirror 26. From the mirror 26 (Figs. 1 and 2) they are reflected via the further mirrors 27 and 28 on the opaque disc 19, as illustrated by the ray course 29 entered in dotted lines. In a similar manner the light emitted by the lamp 30 is collected by lens system 31, 32 and thrown by a mirror 33 on to the glass disc 9 (Fig. 3) belonging to the lower scale carrier 7. The light emitted from the illuminated scale parts on the glass disc 9 passes through the projection lens 34 and is deflected to the right by a prism 35 so that it falls onto a mirror 36. From the mirror 36 (Figs. 2 and 3) the light ray is thrown in corresponding manner by way of further mirrors 37 and 38 onto the opaque disc 19, according to the dotted ray course 39. For reasons of clarity, the mirrors 36, 37, 38 are not shown in Fig. 1.

Moreover, the remaining parts of the enlarging optical system, with the exception of the reflectors 26 and 36 (Fig. 2) secured to the flange part 13, are mounted on supports 40, 41, 42 (Figs. 2 and 3), which in turn can be screwed to the base 3. Fig. 1 shows in broken-off form the supports 41, 42 located at the front and the parts secured to them are consequently not indicated. The lamp 30 and the retaining means for one condenser lens 31 (Fig. 3) can be erected directly on the base 3. As can be seen further from the dotted ray courses 29 and 39 (Fig. 2), the optically enlarged sections of the fine scales are depicted side by side along the length of the line-shaped reading mark 43 made on the opaque disc 19. If from this position one or both of the fine scale carriers 7 and 10 are slowly rotated in a clock-wise direction, then, obviously taking into account the optical inversion by the projection lenses 24 and 34, the enlarged sections of the fine scales make their way on the projection screen in Fig. 1 from the bottom to the top beyond the reading mark 43.

With each of the two fine scale carriers 7 and 10 is associated a coarse scale carrier 44 and 45. The coarse scale carriers 44 and 45 are rollers which are rotatable in a horizontal direction and which extend parallel to the reading mark 43 present on the opaque disc 19 and are each separately rotatable side by side on the shaft 46. The shaft 46 is secured in projecting arms of two supporting struts 47 and 48 (Figs. 1 and 2) which at the same time are used for holding the opaque disc 19 and are screwed on the base 3 by means of a common base plate 49. Between the projecting arms of the supporting struts 47 and 48 a thread-like reading mark 50 is stretched parallel to the shaft 46 and obliquely thereabove (Fig. 1) directly above the surface of the rollers 44 and 45. Below a window 51 recessed in the casing 4 (Fig. 1) for reading the fine scale sections which are visibly enlarged on the screen 19, there is made a further window 52 through which under the reading mark 50 large sections of the coarse scales fitted to the jacket surfaces of the rollers 44 and 45 (Fig. 2) are directly visible.

Figure 2:
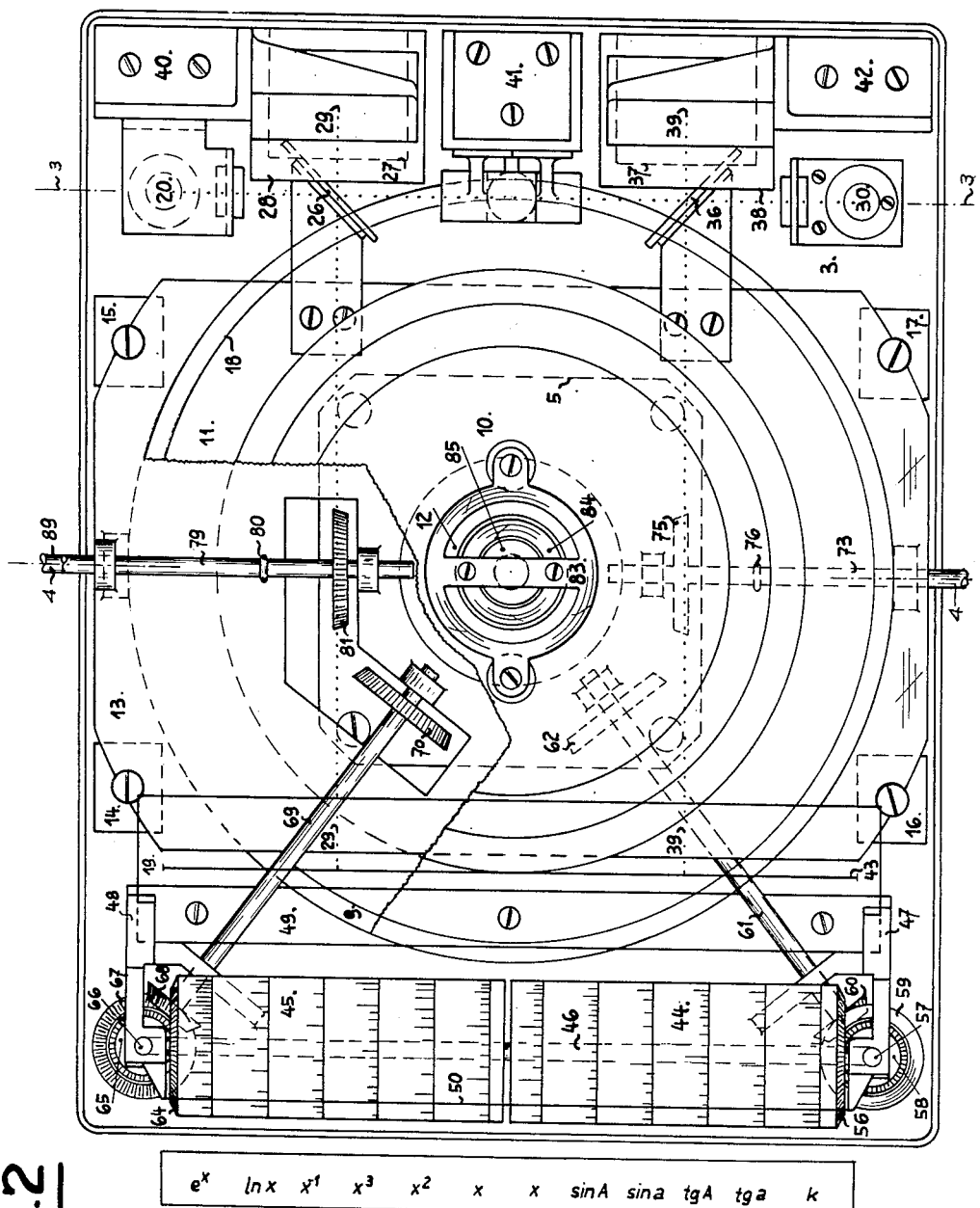
Fig. 2 is a plan view corresponding to Fig. 1 with the casing removed.
Figure 3:
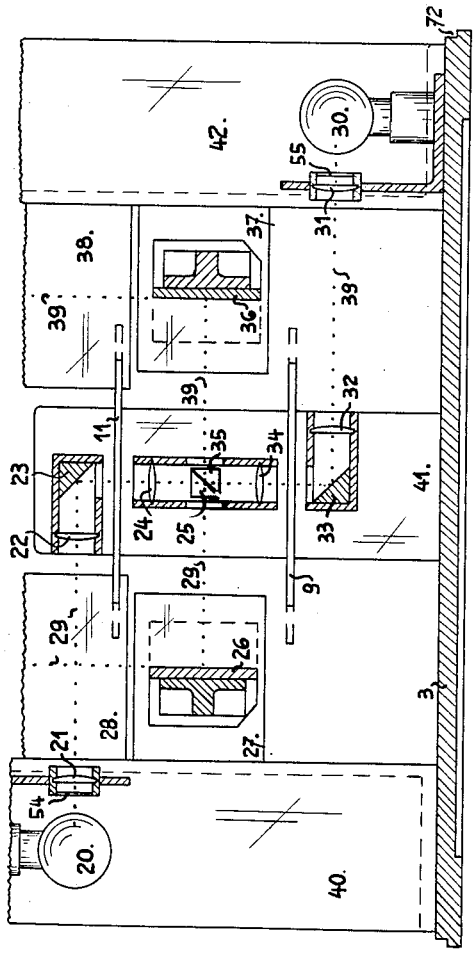
Fig. 3 is a cross section on the line 3—3 of Figs. 1 and 2.

The coarse scales present on the scale carriers 44 and 45 are fitted in the same sequence and arrangement as their associated corresponding fine scale sections reproduced on the opaque disc 19. If, for instance, the glass disc 11 of the upper scale carrier 10 possesses, seen radially from the inside to the outside the fine scales of the functions $e^x$, log $x$, $x^{-1}$, $x^3$, $x^2$, $x$, then enlarged sections of these functions appear on the opaque disc 19 in the sequence indicated, beginning on the side of the strut 48 (Fig. 2) and advancing towards the middle of the opaque disc. In this same sequence the corresponding coarse scales are arranged on the roller 45 associated with the fine scale carrier 10, as indicated by the lettered plate 53 (Fig. 2). If furthermore the functions $x$, sin A (large angle), sin $a$ (small angle), tg A (large angle), tg $a$ (small angle), K (usual constants), are to be placed on the roller 44 in the sequence indicated, then in similar manner the fine scales of the said functions must be placed in this sequence radially from the outside to the inside on the glass disc 9 of the associated lower fine scale carrier 7.

As can be seen from Fig. 1, the lettered plate 53 is preferably disposed between the two windows 51 and 52; in Fig. 2 the plate 53 has only been drawn next to the rollers 44 and 45 for reasons of clearer graphical representation.

For facilitating the reading of the various coarse and fine sections of the scales the coarse scales present on the roller 45 and the corresponding fine scale sections (Figs. 1 and 2) visible through the window 51 above the roller 45 can be made distinguishable for instance by a red colouring and the coarse scales present on the roller 44 and the corresponding fine scale sections located above the roller 44 and visible through the window 51 can be made distinguishable for instance by a green colouring. For this purpose, it is advantageous to fit in front of the lens 21 (Fig. 3) a colour filter 54 permitting the passage of red light, and in front of the lens 31 a colour filter 55 permitting the passage of green light. Using such colour filters 54 and 55 has the further advantage that the lenses 21, 22, 24 and 31, 32, 34 do not have to be achromatic lenses, whereby in particular shorter focal lengths can be obtained with the projection lenses 24 and 34 and consequently higher enlargements with given image spacing.

The two rollers 44 and 45 are each mechanically coupled with the fine scale carriers 7 and 10 by way of a toothed gearing. The side of the roller 44 facing the supporting strut 47 carries a toothed wheel 56 in mesh with a toothed wheel 58 disposed on the vertical shaft 57. On the shaft 57 is a further toothed wheel 59 which is in mesh with a toothed wheel 60 on a horizontal shaft 61 (Figs. 1 and 2). Finally, a further toothed wheel 62 secured on the shaft 61 engages in a toothed rim 63 disposed on the lower fine scale carrier 7 (Fig. 1).

Similarly, the side of the roller 45 facing the supporting strut 48 has a toothed wheel 64 (Fig. 2), which, by way of a toothed wheel 65, a shaft 66 (Figs. 1 and 2), toothed wheels 67 and 68, a shaft 69 and a toothed wheel 70, is mechanically coupled with the toothed rim 71 (Fig. 1) seated on the upper fine scale carrier 10. The said two toothed gearings are such that manifestly on a rotation of the fine scale carriers 7 and 10 in a clock-wise direction (Fig. 2) the two rollers 44 and 45 in the illustration according to Fig. 1 are also rotated in a clock-wise direction. Consequently if one observes through the two windows 51 and 52 (Fig. 1) the associated sections of a coarse scale and the corresponding fine scale, these move, on rotation of the scale carriers 7, 44 or 10, 45 in the same direction beyond the reading marks 43 and 50. The operation of the instrument in practice is thereby made much easier. Further, because on the scale carriers 7, 44 and 10, 45 the beginning of the scale and the end of the scale of the functions employed coincide for $x$, $x^{-1}$, and for integral positive powers of $x$, with circular construction of the scale graduation, the transmission ratio of the toothed gearings described above is preferably made 1:1. A complete revolution of the fine scale carriers 7 or 10 then likewise causes a full revolution of the corresponding coarse scale carriers 44 or 45.

Figure 4:
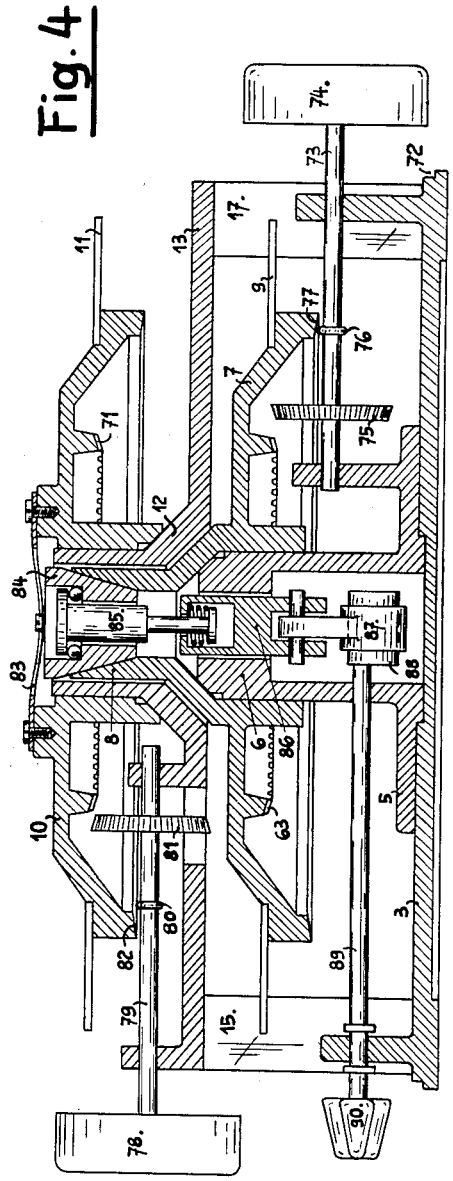
Fig. 4 is a cross section on the line 4—4 of Figs. 1 and 2.

Finally, Fig. 4 shows in partial sectional an adjusting device which can be operated from outside the casing 4 and by means of which each of the pairs 7, 44 or 10, 45 consisting of a fine scale carrier and its associated coarse scale carrier, can be each rotated at will individually or simultaneously, to bring the desired scale parts over the corresponding reading marks 43 or 50 (Figs. 1 and 2). Here, in Fig. 4, as in Fig. 3, the casing 4, which can be supported on the shoulder 72 of the base 3 has not been shown for reasons of clarity. In the form of construction shown the adjusting device consists of a drive with coarse and fine setting for the scale carriers 7, 44, a drive with coarse and fine setting for the scale carriers 10, 45, and a coupling device by which the scale carriers 7, 44 and 10, 45 can be jointly rotated.

For the drive of the scale carriers 7, 44 a shaft 73 is provided which is mounted so as to be axially displaceable, and has a part projecting beyond the casing wall, said part carrying the actuating knob 74. The shaft 73 carries a toothed wheel 75 for effecting the coarse setting and a small friction disc 76 for the fine setting. Now if the actuating knob 74 is pressed to the left (Fig. 4), the toothed wheel 75 comes into engagement with the toothed rim 63 and the scale carriers 7, 44 are coarsely set by rotating the knob 74. For actuating the fine setting, the knob 74 is pushed to the right, so that the friction disc 76 bears on the lower conical surface 77 of the fine scale carrier 7 as already indicated in the drawing. By rotating the knob 74 the fine scale carrier 7 can be finely set without any backlash; the roller 44 obviously also makes the fine movement in association with the scale carrier 7, in as far as the said motion is not located within the play of the toothed gearing shown in Figs. 1 and 2.

The drive of the scale carriers 10, 45 is effected in similar manner by means of the knob 78, the shaft 79, the friction disc 80 and the toothed wheel 81. The shaft 79 is likewise axially displaceable, in order to make possible coarse and fine setting, and the scale carrier 10 has an appropriate conical face 82. In Fig. 4, the shaft 79 is shown in the nonoperative position in which neither the fine setting with the friction disc 80 nor the coarse setting with the toothed wheel 81 is engaged. With the shafts 73 and 79, this nonoperative position can be fixed so that it can be felt by means of grooves (not shown).

The coupling device uses a spring disc 83 (Fig. 2) provided with recesses, which is screwed firstly to the scale carrier 10 and secondly to a hollow cone 84 (Figs. 1 and 4). In the hollow cone 84 the upper part of a member 85 is rotatably mounted on a ball bearing, the lower part of the member 85 engages in a spring loaded sleeve 86. A movable eccentric slide valve 87, is flexibly connected to the lower part of the spring sleeve 86 and this slide valve 87 is in turn rotatably seated on the eccentric disc 88. The eccentric disc 88 can be adjusted from outside the casing of the instrument by an actuating knob 90 on a shaft 89. Grooves (not shown) engaging on the shaft 89 can fix the highest (Fig. 1) and the lowest (Fig. 4) position of the eccentric disc 88. In the highest eccentric position shown in Fig. 1 the spring encased in the spring sleeve 86 is relaxed and the spring disc 83 draws the member 85 and the cone 84 upwards. The coupling between the scale carriers 7, 44 on the one hand and 10, 45 on the other hand is thus released; consequently each of the pairs 7, 44 and 10, 45 can be set and rotated independently of the other pair.

If, for instance for performing multiplications or divisions, the pairs of scale carriers 7, 44 and 10, 45 are to be rotated with each other, then the knob 90 is turned through half a revolution so that the eccentric disc 88 changes over from the highest position shown in Fig. 1 into the lowest position shown in Fig. 4. The spring present in the spring sleeve 86 is somewhat compressed, overcomes the action of the spring disc 83 and draws the member 85 and the cone 84 downwards until the cone 84 is pressed onto the hollow counter-cone 8 of the scale carrier 7. The pairs of scale carriers 7, 44 and 10, 45 are thus coupled with each other. In Fig. 4, the scale carrier 10 is rotated through 90° as compared with the illustration in Figs. 1 and 2 in order to illustrate better the downward deflection of the spring disc 83. Now in order to rotate the pairs 7, 44 and 10, 45 at the same time one of the two shafts 73 or 79 is brought into the nonoperative position (Fig. 4) and the coarse or fine adjustment is effected as desired by means of the other shaft.

All parts of decisive importance for the accuracy of the instrument are evidently disposed within the casing 4. In particular the entire optical system and the fine scales on the glass discs 9 and 11 are fully enclosed from external effects, and in particular are protected against direct handling and against dust. Soiling of the fine scales and of the optical equipment is thus not possible in normal use of the instrument. Scale parts sliding upon each other are avoided by the axial distancing of the scale carriers 7 and 10 so that wear of any kind on the fine scales does not occur. The accuracy and fineness of graduation of the fine scales can for these reasons be carried very high. It is, for instance, possible to carry out exactly the division of the normal x-scale even at the end thereof (with number values between 9,000 and 10,000) to five figures, so that with an optical magnification of about 30 to 60 reading can be carried out exactly to four figures and the fifth figure can still be estimated. The equivalent scale length of the magnified fine scales is thus over twenty metres, while the spacings between successive graduation lines on the glass discs 9 and 11 can be of the order of one hundredth of a millimetre. On numerical calculation with the instrument, one thus has practically the same accuracy as on calculating with the usual five figure logarithm tables but with the difference that the amount of time required for a calculating operation is quite substantially less.

The coarse scales on the rollers 44 and 45 permit a good general view of large sections of the scales and are particularly convenient in order to be able to set the desired numerical value quickly, The accuracy of the coarse scales is approximately that of a normal pocket slide rule, since a reading accuracy to two or three figures is sufficient. The coarse scales can therefore also be used for the rapid execution of rough estimating and checking calculations, because when the coarse scales are used alone, fine setting thereof is not necessary. Here the described roller-shape construction of the coarse scale carriers makes it possible to dispose a large number of different scales side by side in the same clear manner.

The simultaneous employment of coarse and fine scales further makes it possible on reading a value, to read the first two to three figures from the coarse scales and only to take the last two to three figures thereof from the optically magnified fine scales. The numberings on the fine scale graduations therefore do not need to contain the first two figures, whereby it becomes possible to move adjoining fine scales closer to each other and to accommodate a greater number of scales in a given place. In the drawings (Fig. 2) only six scales per scale carrier are indicated, but considerably more scales can be arranged without increasing the dimensions of the instrument. The instrument can then serve not only for exact calculating but can also replace the tables of mathematical functions (trigonometrical and so on) which are otherwise necessary from time to time.

The invention is not limited to the particular embodiment herein shown and described. It may be advisable, for instance, to provide metallic shields inside the casing to protect the fine scale carriers against heat emitted by the electric lamps 20 and 30 (Figs. 1 and 2). This and other modifications which may occur to those familiar with the art fall within the spirit and scope of the invention as set forth in the following claims.

We claim:

1. A calculating instrument having a plurality of rotatable scale carriers, each of the scale carriers having lined scales according to the principle of the slide rule, the casing of the instrument enclosing rotatable scale carriers which each have one or more fine scales, and an illuminating device and a magnifying optical system by means of which a small section of said fine scales is depicted in enlarged scale on a projection screen provided on said casing, each of said fine scale carriers being mechanically coupled by means of a toothed gearing with a further rotatable scale carrier on which are located mutually corresponding coarse scales which over a large section of their length are made directly visible, all the fine scale carriers being each disposed co-axially and all the coarse scale carriers being each disposed co-axially.

2. The invention as recited in claim 1, wherein the co-axially disposed fine scale carriers are circular discs on the surface of which the fine scales are located and which discs are spaced from each other in an axial direction, and wherein the co-axially disposed coarse scale carriers are rollers disposed side by side in an axial direction, the outer surfaces of which rollers have the directly visible coarse scales, the transmission ratio of the toothed gearings present between each circular disc and its associated roller being 1:1.

3. The invention as recited in claim 2, wherein the fine scale carriers are fitted in the lower part of the casing, their axis of rotation standing perpendicular to the base plane of the instrument, the axis of rotation of the coarse scale carriers being disposed parallel to the base plane of the instrument, a window being provided in the top part of the front wall of the casing for reading the sections of the fine scales depicted magnified on the projection screen fitted behind said window, and a further window being situated below the first mentioned window through which further window the sections visible of the corresponding coarse scale can be read.

4. The invention as recited in claim 2, wherein a line-shaped reading mark placed above the rollers runs parallel to the axial direction of the rollers and the axial direction of the rollers runs parallel to the reading mark visible on the projection screen, and the directly readable coarse scales present on the rollers being applied in the same sequence and arrangement as the corresponding sections of the fine scales depicted magnified on the projection screen.

5. A calculating instrument having a plurality of rotatable scale carriers, each of said scale carriers having lined scales according to the principle of the slide rule, the casing of the instrument enclosing rotatable scale carriers which each have one or more fine scales, an illuminating device and a magnifying optical system by means of which a small section of said fine scales is depicted in enlarged scale on a projection screen provided in said casing, each of said fine scale carriers being mechanically coupled with a further rotatable scale carrier on which are located mutually corresponding coarse scales which over a large section of their length are made directly visible, and an adjusting device operable from outside the casing of the instrument, by means of which each of the pairs consisting of a fine scale carrier and the corresponding coarse scale carrier mechanically coupled with it can be rotated individually or simultaneously with each other at will.

6. The invention as recited in claim 5, wherein inside the casing, there is associated with each fine scale carrier its own projection lens, and a plurality of mirrors is fitted with which the enlarged sections of all the fine scales are depicted side by side on the projection screen in the direction of a straight line reading mark visible on said projection screen.

7. A calculating instrument having a plurality of rotatable scale carriers, each of which having lined scales according to the principle of the slide rule, the casing of the instrument enclosing two rotatable scale carriers which each have a plurality of fine scales, a small section of said fine scales being depicted by means of an illuminating device and a magnifying optical system in enlarged scale on a projection screen, each of said two fine scale carriers being mechanically coupled with a further rotatable scale carrier on which are located mutually corresponding coarse scales which over a large section of their length are made directly visible, an adjusting device operable from outside the casing of the instrument by means of which the one pair consisting of a fine scale carrier and the corresponding coarse scale carrier mechanically coupled with it can be rotated, an adjusting device operable from outside the casing of the instrument by means of which the other pair consisting of a fine scale carrier and the corresponding coarse scale carrier mechanically coupled with it can be rotated, and a coupling device operable from outside the casing of the instrument in the released position of which said two pairs of scale carriers can be rotated individually and in the closed position of which said two pairs of scale carriers can be rotated simultaneously by means of said two adjusting devices.

8. The invention as recited in claim 7, wherein each of said two adjusting devices comprises manually operable means for the coarse setting of the scale carriers and manually operable means for the fine setting of the scale carriers.

ERHARD KARL METTLER.
JOHANN MEIER.

REFERENCES CITED

The following references are of record in the file of this patent:

UNITED STATES PATENTS

| Number | Name | Date |
|---|---|---|
| 922,465 | Fenn | May 25, 1909 |
| 2,177,176 | Gilmore | Oct. 24, 1939 |
| 2,356,274 | Roger | Aug. 24, 1944 |
| 2,365,613 | Wibmer et al. | Dec. 19, 1944 |
| 2,552,272 | Fultz | May 8, 1951 |